United States Patent
Dultz et al.

(10) Patent No.: US 6,249,350 B1
(45) Date of Patent: *Jun. 19, 2001

(54) INTERFEROMETER AND METHODS FOR COMPENSATION OF DISPERSION OR INCREASE IN SPECTRAL RESOLUTION OF SUCH AN INTERFEROMETER

(75) Inventors: Wolfgang Dultz, Frankfurt am Main (DE); Erna Frins, Montevideo (UY); Bernd Hils, Koenigstein; Heidrun Schmitzer, Regensberg, both of (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,005

(22) PCT Filed: Aug. 1, 1997

(86) PCT No.: PCT/EP97/04189

§ 371 Date: Dec. 9, 1999

§ 102(e) Date: Dec. 9, 1999

(87) PCT Pub. No.: WO98/05933

PCT Pub. Date: Feb. 12, 1998

(30) Foreign Application Priority Data

Aug. 5, 1996 (DE) .............................. 196 31 642
Jul. 17, 1997 (DE) .............................. 197 30 572

(51) Int. Cl.$^7$ ..................................... G01B 9/02

(52) U.S. Cl. .................. 356/491; 356/451; 356/453

(58) Field of Search ............................. 356/345, 351, 356/346

(56) References Cited

U.S. PATENT DOCUMENTS 4,705,354 * 11/1987 Ulrich ............................ 356/345
5,379,115    1/1995 Tsai .

FOREIGN PATENT DOCUMENTS 44 18 213    11/1995 (DE) .

OTHER PUBLICATIONS

Y. V. Trositski, "Dispersion–free, multiple–beam interferometer", Applied Optics, Aug. 1, 1995, vol. 34, No. 22 pp. 4717–4722.

* cited by examiner

Primary Examiner—Robert Kim
(74) Attorney, Agent, or Firm—Kenyon & Kenyon

(57) ABSTRACT

A double-beam interferometer for electromagnetic radiation and a method for the compensation of dispersion or increase in the spectral resolution of such an interferometer. Using a polarizer, which is brought into the optical radiation path, a defined polarization state $P_{1/2}^0$ is produced for the electromagnetic partial waves flowing into the arms of the interferometer. This polarization state is wavelength-independent and can vary for both partial beams. Optical elements modify the polarization state $P_{1/2}^0$ of the electromagnetic partial waves as a function of wavelength $\lambda$ and each spectral component $\lambda_i$ is coded with a polarization $P_{1/2}(\lambda.i)$. An analyzer, fitted to the output of the interferometer, transmits an adjustable polarization state $P_{det}$, whereby an additional wavelength-dependent phase difference $\gamma(\lambda)$ occurs between the partial waves of the spectral components. $\gamma(\lambda)$ can be adjusted to obtain compensation of dispersion or an increase in the spectral resolution of the interferometer.

16 Claims, 5 Drawing Sheets

INTERFEROMETER AND METHODS FOR COMPENSATION OF DISPERSION OR INCREASE IN SPECTRAL RESOLUTION OF SUCH AN INTERFEROMETER

FIELD OF THE INVENTION

The invention relates to an interferometer and a method for compensating for the dispersion and a method for increasing the spectral resolution of an interferometer.

Related Technology

The measuring principle behind an interferometer for electromagnetic radiation is based on the interference between two coherent electromagnetic partial waves $\psi_1$ and $\psi_2$, which have a defined phase relationship to each other, i.e., the same wavelength $\lambda$, and on which a fixed phase difference $\Delta\phi$, which is constant over time, is superimposed. The intensity $I_{det}$ of the superimposed wave is detected. $I_{det}$ is proportionate to $a+\cos(\Delta\phi)$, where a is a constant. Only identical polarization components, such as electrical field vectors along the x axis, always interfere with one another.

In a two-beam interferometer, the radiation from a radiation source is split into two beam components with a relative phase difference of zero and each beam component supplied to one interferometer arm. The interferometer arms can have different optical path lengths, superimposing a phase difference not equal to zero upon the partial waves after they pass through the interferometer. In a two-beam interferometer with an optical path length difference of $\Delta ln$ between the two interferometer arms, the phase difference between the partial waves is $$\Delta\varphi = 2\pi \frac{\Delta(\ln)}{\lambda}.$$

l is the actual path length and n the refractive index of the medium. This interferometer phase $\Delta\phi$ is dependent on wavelength $\lambda$ and on $\Delta ln$, and can therefore be used, if one quantity is known, to precisely measure the other quantity.

Interferometers are used, for example, to measure the length of such objects as gauge blocks, to measure the refractive index, or in spectroscopy.

Length measurements, i.e., measurements of the variation in optical path length difference $\Delta ln$, become corrupted by wavelength fluctuations, since variations in the wavelength produce a variation in the interferometer output signal $I_{det}$, even though $\Delta ln$ remains the same. To remedy this disadvantage, Y. Troitski, Applied Optics 34 44717 (1995) proposes a dispersion-free interferometer which nearly compensates for the wavelength dependence of the output signal by applying vapor to the interferometer mirror. The disadvantage of method is that the application of vapor to the mirror makes it expensive and inflexible. The working area of the interferometer, i.e., the range around a basic wavelength $\lambda_0$, within which the output signal is nearly independent of wavelength $\lambda$ of the radiation source, is set to basic wavelength $\lambda_0$ by adjustment after application of the vapor and can no longer be adjusted to actual conditions, e.g., after changing radiation sources. A further disadvantage is that the working area is narrow, which means that dispersion compensation cannot be used for a broader band $\Delta\lambda$ around the basic wavelength $\lambda_0$.

One disadvantage of interferometers used for spectroscopic studies is the great sensitivity of the output signal not only to the wavelength but also to variations in the path length difference of the interferometer arms, caused, for example, by vibrations in the measurement apparatus. This leads to an error-prone spectroscopic measurement result.

SUMMARY OF THE INVENTION

An object of the present invention is to provide an interferometer for electromagnetic radiation which compensates for the wavelength dependence of the output signal in a broad wavelength range $\Delta\lambda$ around an adjustable basic wavelength $\lambda_0$, at the same time maintaining high sensitivity to variations in the interferometer arm length. The object is also to provide an interferometer for electromagnetic radiation in which the spectral resolution is higher than that of conventional two-beam interferometers with comparable arm lengths, thereby stabilizing the output signal toward variations in the interferometer arm length.

The present invention provides an interferometer for electromagnetic radiation, including at least two interferometer arms and one beam splitter, with the light from an electromagnetic radiation source being split by the beam splitter into two beam components and supplied to each of the two interferometer arms; with the same or a further beam splitter again superimposing, on the beam components after they pass through the interferometer arms, a phase difference $$\Delta\varphi = 2\pi \frac{\Delta(\ln)}{\lambda},$$

dependent on optical path length difference $\Delta ln$ within the interferometer arms and on wavelength $\lambda$; and with the intensity of the superimposed wave being measured by a detector that is characterized by the following features:

a) At least one polarizer is provided in the optical path, which establishes a defined polarization state $P_{1/2}^0$ of the electromagnetic partial waves entering the interferometer arms, where the polarization state is independent of the wavelength and can be different for the two beam components.

b) At least one optical element is provided in at least one interferometer arm, with the optical element varying the polarization state $P_{1/2}^0$ of the electromagnetic partial wave as a function of wavelength $\lambda$, i.e., each spectral component $\lambda_i$ is encoded with a polarization $P_{1/2}(\lambda_i)$, so that the electromagnetic partial waves take on polarization states $P_1(\lambda)$ or $P_2(\lambda)$. The regions $P_1(\lambda)$ and $P_2(\lambda)$, shown on the Poincaré sphere, are at least partially different from each other.

c) An analyzer, located at the output if the interferometer, transmits an adjustable polarization state $P_{det}$, thereby forming projections $P_{det}(P_{1/2}(\lambda))$ for each spectral component $\lambda_i$ and producing an additional wavelength-dependent phase difference $\gamma(\lambda)$ between the partial waves of the spectral components, where $\gamma$ is a function of $P_{1/2}(\lambda)$ and $P_{det}$.

The present invention also provides a method using an interferometer of this type, characterized in that the dispersion or wavelength dependence of the output intensity in the range around a basic wavelength $\lambda_0$, is compensated for by the following steps (to achieve stabilization of the interferometer output signal during spectral wavelength fluctuations around $\lambda_0$ and thus increased sensitivity of the interferometer to variations in arm length difference $\Delta l$).

a) Production of a defined wavelength-independent output polarization $P_{1/2}^0$ of the electromagnetic partial waves entering the interferometer arms, where $P_1^0 \neq P_2^0$ is possible.

b) Encoding of the individual spectral components of the electromagnetic partial waves with a wavelength-dependent polarization $P_1(\lambda)$ or $P_2(\lambda)$.

c) Detection of a defined polarization $P_{det}$.

d) Adjustment of the polarization quantities $P_{1/2}^0$, $P_{1/2}(\lambda)$, and $P_{det}$ to each other so that the following applies to wavelength $\lambda$ in the area of $\lambda_0$:

$$\Upsilon(\lambda) = -\tfrac{1}{2}\Omega(P_{det}, P_1(\lambda), P_2(\lambda)) \approx d + 2\pi \frac{\Delta \ln}{\lambda_o^2}(\lambda - \lambda_0)$$

$$\text{or } \frac{d\Omega}{d\lambda}(\lambda_0) \approx -4\pi \frac{\Delta \ln}{\lambda_0^2}$$

where d is a constant and $\Omega(P_{det}, P_1(\lambda), P_2(\lambda))$ is the area of the spherical triangle defined for a fixed $\lambda$ by points $P_{det}$, $P_1(\lambda)$, and $P_2(\lambda)$ when representing the polarization quantities on the Poincaré unity sphere.

The present invention also provides a method using an interferometer of the type described above, characterized in that the spectral resolution of the interferometer is increased in the range around a basic wavelength $\lambda_0$ by the following steps:

a) Production of a defined wavelength-independent output polarization $P_{1/2}^0$ of the electromagnetic partial waves entering the interferometer arms, where $P_1^0 \ne P_2^0$ is possible.

b) Encoding of the individual spectral components of the electromagnetic partial waves with a wavelength-dependent polarization $P_1(\lambda)$ or $P_2(\lambda)$.

c) Detection of a defined polarization $P_{det}$.

d) Adjustment of the polarization quantities $P_{1/2}^0$, $P_{1/2}(\lambda)$, and $P_{det}$ to each other so that $\Delta\phi(\lambda_0) << \tfrac{1}{2}\Omega(P_{det}, P_1(\lambda_0), P_2(\lambda_0))$ applies to $\lambda_0$, where $\Omega(P_{det}, P_1(\lambda_0), P_2(\lambda_0))$ is the area of the spherical triangle defined by points $P_{det}$, $P_1(\lambda_0)$, and $P_2(\lambda_0)$ when representing the polarization quantities on the Poincaré unity sphere.

An interferometer according to the present invention and a method that may be carried out with an interferometer according to the present invention are based on the following concepts:

The phase difference $\Delta\phi$ induced in the interferometer between the two partial waves, which determines the output signal of the interferometer, is a function of wavelength $\lambda$ and arm length difference $\Delta \ln$:

$$\Delta\varphi(\lambda, \Delta \ln) = 2\pi \frac{\Delta \ln}{\lambda}$$

As a function of the wavelength, i.e., if wavelength $\lambda$ deviates slightly from a basic wavelength $\lambda_0$, while the path lengths remain constant, the phase difference may be developed as follows:

$$\Delta\varphi(\lambda) \approx 2\pi \frac{\Delta \ln}{\lambda_0} - 2\pi \frac{\Delta \ln}{\lambda_0^2}(\lambda - \lambda_0)$$

$$= c - 2\pi \frac{\Delta \ln}{\lambda_0^2}(\lambda - \lambda_0); c = \text{const.}$$

When measuring lengths, however, a phase difference which depends only on optical path length difference $\Delta \ln$, and not on $\lambda$ or $(\lambda - \lambda_0)$, is desirable. In particular, the phase difference should remain constant with a constant path length difference. If we manage to add an additional wavelength-dependent term $\gamma(\lambda)$ to the phase difference, where $\gamma(\lambda)$ has the format:

$$\Upsilon(\lambda) \approx d + 2\pi \frac{\Delta \ln}{\lambda_0^2}(\lambda - \lambda_0); d = \text{const.}$$

The overall phase difference $\Delta\phi(\lambda) + \gamma(\lambda)$ between the two beam components is independent of the wavelength in the first approximation. The detected signal therefore does not vary when wavelength $\lambda$ of the radiation source deviates from the basic wavelength $\lambda_0$. The output signal therefore remains fully dependent on the optical path. $\gamma(\lambda)$ represents an abnormal dispersion term that is characterized by a refractive index that increases along with the wavelength.

The additional phase $\gamma(\lambda)$ is introduced as follows: First, a defined, wavelength-independent polarization state $P_{1/2}^0$ of the partial waves $\psi_1$ and $\psi_2$ entering the interferometer arms is established. This can be achieved by a polarizer located behind the radiation source or by a polarizing beam splitter at the entrance to the interferometer arms, or a combination of both. It is also possible to use a radiation source which generates light in a defined polarization state, such as a laser. In this case, other polarizing elements are not necessary. What is important is that polarization $P_{1/2}^0$ is independent of the wavelength.

Polarizing elements, which change the polarization state of the transmitted light as a function of its wavelength, are positioned in the interferometer arms, at least in one of the two. They therefore encode each spectral component of wavelength $\lambda$ with a polarization $P_1(\lambda)$, or $P_2(\lambda)$, depending on the interferometer arm. These polarization-encoding optical elements are double-refractive, optically active or elliptically double-refractive plates, such as crystal plates. It is also possible to use two additional two-beam interferometers for encoding the polarization.

Polarization quantities $P_1(\lambda)$ and $P_2(\lambda)$ should not be identical for a certain wavelength $\lambda$ within the range of a basic wavelength $\lambda_0$. If we represent the polarization quantities as normalized Stokes vectors on the Poincaré sphere, this means that the regions $P_1(\lambda)$ and $P_2(\lambda)$ do not overlap, at least in part. The following quadruple vector is defined as the Stokes vector:

P=(I, M, C, S)

with $$I = |\bar{e}_x \bar{E}|^2 + |\bar{e}_y \bar{E}|^2$$

$$M = |\bar{e}_x \bar{E}|^2 - |\bar{e}_y \bar{E}|^2$$

$$C = 2\operatorname{Re}[(\bar{e}_x \bar{E}) * (\bar{e}_y \bar{E})]$$

$$S = 2\operatorname{Im}[(\bar{e}_x \bar{E}) * (\bar{e}_y \bar{E})]$$

where I is the overall intensity of the electromagnetic wave progressing in the direction of $\bar{e}_z$ with electrical field vector E; M represents the degree of polarization ellipticity; C and S each show the progression from +45° to −45°, or from right-rotating to left-rotating-polarized light. Polarized light yields:

$$I^2 = M^2 + C^2 + S^2,$$

i.e., all Stokes vectors lie on the same sphere having radius I: the Poincaré sphere. If the intensity is normalized, this sphere has a radius of 1. The intensity does not need to be taken into consideration if the point is only to represent the polarization quantities. Stokes vector P=(1, 0, 0, 1), for example, represents fully left-rotating-polarized light, while P=(1, 0, 1, 0) describes light that has been polarized linearly at 45°.

Due to the wavelength dependence of the double refraction, optical activity, or elliptical double refraction, the various spectral components are converted from the common output polarization $P_{1/2}^0$ to various wavelength-dependent polarization states $P_1(\lambda)$ and $P_2(\lambda)$ after passing through the interferometer arms. To prevent areas $P_1(\lambda)$ and $P_2(\lambda)$ from overlapping completely, the polarization-encoding optical elements are oriented in different directions in the interferometer arms.

Because the polarizer is positioned upstream from the detector or, alternatively, having a separate polarizer in each interferometer arm, only a specific detection polarization $P_{det}$ is detected. For each spectral component $\lambda_i$, therefore, projections $P_{det}(P_1(\lambda_i))$ and $P_{det}(P_2(\lambda_i))$ of the partial waves are formed and made to interfere. This produces an additional wavelength-dependent phase difference $\gamma(\lambda_i)$ between the partial waves of the spectral components. This additional wavelength-dependent phase $\gamma(\lambda)$ yields:

$$\gamma(\lambda) = -\tfrac{1}{2}\Omega(P_{det}, P_1(\lambda), P_2(\lambda))$$

where $\Omega(P_{det}, P_1(\lambda), P_2(\lambda))$ is the area of the spherical triangle defined by points $P_{det}, P_1(\lambda)$ and $P_2(\lambda)$ in the polarization representation on the Poincaré unity sphere. $\gamma(\lambda)$ is thus a function of polarization quantities $P_{det}(P_1(\lambda))$ and $P_2(\lambda)$. $\gamma(P_{det}, P_1(\lambda), P_2(\lambda))$ is referred to as Pancharatnam's phase.

To compensate for dispersion, quantities $P_{det}(P_1(\lambda))$ and $P_{det}(P_2(\lambda))$ are chosen so that wavelength $\lambda$ in the area of a basic wavelength $\lambda_0$ yields:

$$\Upsilon(\lambda) \approx d + 2\pi \frac{\Delta \ln}{\lambda_0^2}(\lambda - \lambda_0); d = \text{const.}$$

The working area may be set in this manner by varying the input polarization (quantities), the polarization-encoding elements, e.g., their angular position, thickness, inclination, or detection polarization.

If we then place optical elements with a very high retardation in the interferometer arms, the wavelength dependence of the transmission characteristic is determined by an equally large $\gamma(\lambda)$ value and no longer by interferometer phase $\Delta\phi$. As a result, the interferometer is relatively insensitive to variations in the path length difference in this area because the length sensitivity is determined by $\Delta\phi$ alone. Interferometers having this characteristic are therefore suitable for precise spectroscopy.

BRIEF DESCRIPTION OF THE DRAWINGS

The present invention is further elucidated below with reference to the drawings, in which.

DETAILED DESCRIPTION

Figure 1:
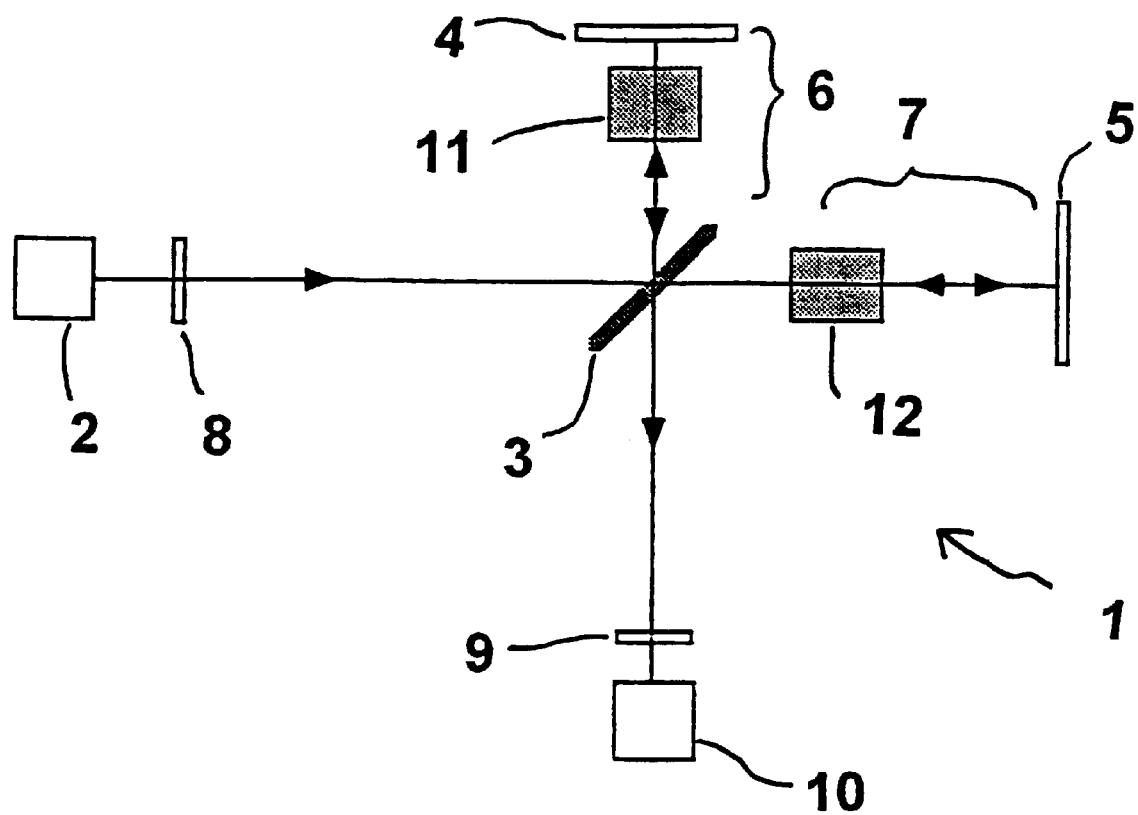
FIG. 1 shows a schematic representation of an interferometer according to the invention.

FIG. 1 shows an interferometer 1 according to the invention for electromagnetic radiation in which the light from an electromagnetic radiation source 2 is split into two beam components by a beam splitter 3 and the two beam components supplied to a separate interferometer arm 6, 7. The radiation source is, for example, a laser or another source of at least partially coherent light. The beam components are each superimposed onto themselves by a mirror at the end of the interferometer arms and reflected back to the same optical path. After passing through the interferometer arms, they are again superimposed onto themselves by the same beam splitter 3. The intensity of the superimposed wave is measured by a detector 10.

Without any further action by the optical elements provided in the optical path, a phase difference $$\Delta\varphi = 2\pi \frac{\Delta(\ln)}{\lambda}$$

dependent on optical path difference $\Delta\ln$ within the interferometer arms and on wavelength $\lambda$ would be superimposed upon the partial waves after they pass through the interferometer arms. Depending on the phase difference and degree of radiation coherence, this could fully extinguish the intensity measured at the detector.

The partial waves supplied to the interferometer arms are polarized by a polarizer 8. It establishes a defined input polarization $P_{1/2}^0$ of the electromagnetic partial waves entering the interferometer arms. In this case, $P_1^0 = P_2^0$ applies, since the beam splitter 3 splits the beam independently of the polarization.

An optical element 11, 12 which changes the polarization of the partial waves as a function of the wavelength is positioned in each of the two interferometer arms. Each spectral component $\lambda_i$ is thus encoded with a polarization $P_{1/2}(\lambda_i)$, so that the electromagnetic partial waves take on polarization states $P_1(\lambda)$ and $P_2(\lambda)$. Represented on the Poincaré sphere, regions $P_1(\lambda)$ and $P_2(\lambda)$ are at least partially different, which is achieved through the use of different optical elements 11, 12 or such elements with different settings.

An analyzer 9 which transmits an adjustable polarization state $P_{det}$ is positioned upstream from the detector, at the interferometer output. This analyzer 9 forms projection $P_{det}(P_1(\lambda_i))$ or $P_{det}(P_2(\lambda_1))$ for each spectral component $\lambda_i$, with these projections interfering with each other downstream from the analyzer. The analyzer produces an additional wavelength-dependent phase difference $\gamma(\lambda)$ between the partial waves of the spectral components, where $\gamma$ is a function of $P_{1/2}(\lambda)$ and $P_{det}$. An alternative method is to have the partial waves interfere upstream from the analyzer, producing a wave with polarization $P(\lambda_i)$ and forming projection $P_{det}(P((\lambda_i))$ in this manner. The result is the same in terms of the measured output intensity.

The detection polarization may be any elliptical polarization, as the input polarization may be. Linear polarization quantities are especially easy to implement.

Figure 2:
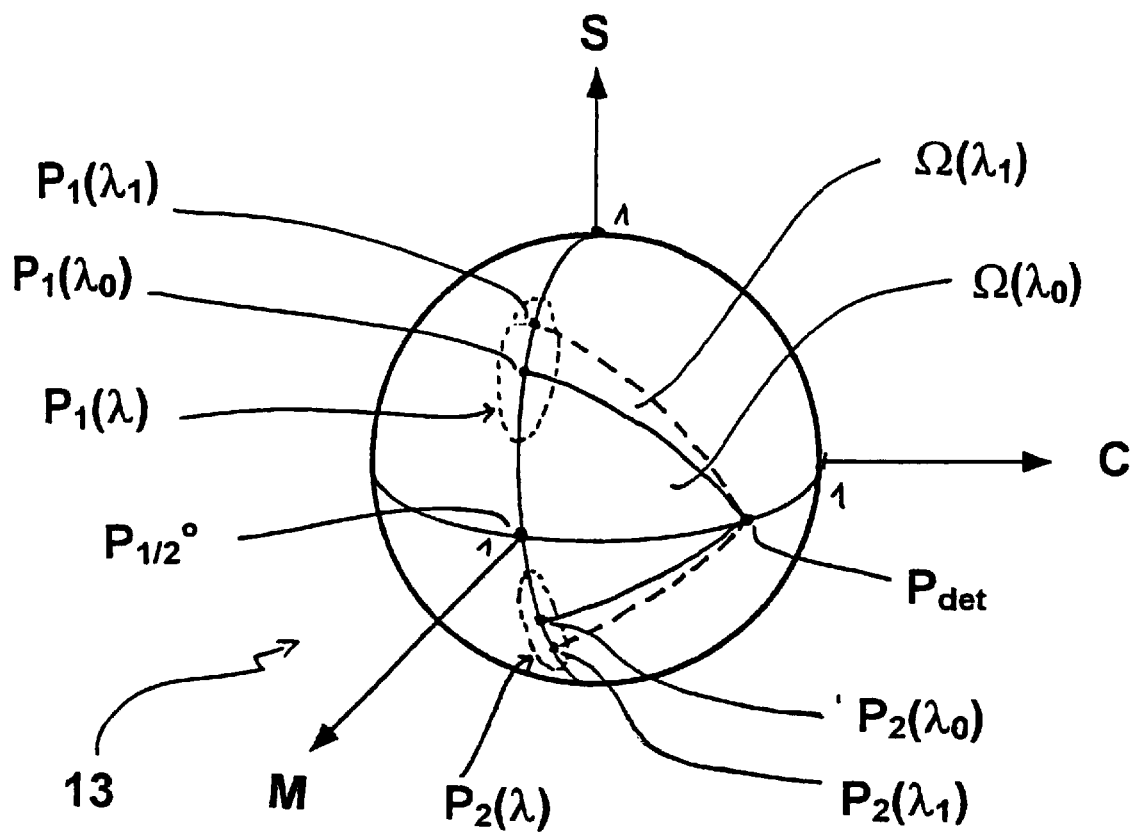
FIG. 2 shows a Poincaré sphere illustrating polarization quantities $P_{det}$, $P_1(\lambda)$ and $P_2(\lambda)$.

FIG. 2 shows a Poincaré sphere 13 for representing polarization quantities $P_{1/2}^0$, $P_{det}$, $P_1(\lambda)$ and $P_2(\lambda)$. The Poincaré sphere is located at the origin of a coordinate system, with the quantities M, C, and S defined above being plotted along the axes. In this representation, all genuine polarization states are points on the surface of the Poincaré sphere with a radius of 1, i.e., $M^2+C^2+S^2=1$ always applies. In the description below, the first component in the Stokes vector defined above (the intensity) is omitted because the intensity was normalized to one. The north pole of the sphere, at coordinates (0, 0, 1), fully corresponds to left-rotating-polarized light; points at the equator correspond to linearly polarized light with different oscillation levels of the electrical field vector. Regions in the upper hemisphere correspond to any left-rotating elliptical polarization quantities, and regions in the lower hemisphere to right-rotating elliptical polarization quantities.

An input polarization $P_{1/2}{}^0$ of the partial waves entering the interferometer arms is generated at the interferometer input, using the polarizer. In this representation, $P_{1/2}{}^0$ lies on the equator of the Poincaré sphere, as well as on the M axis, and therefore has coordinates (1, 0, 0) for all wavelengths. $P_{1/2}{}^0$ is therefore wavelength-independent light polarized linearly along the x axis.

The polarization-changing optical elements positioned in the interferometer arms vary the input polarization of both beam components independently of each other as a function of the wavelength. The polarization quantities of spectral components $\lambda$ of the first beam component (left-rotating polarization quantities) are plotted onto the upper hemisphere in a region $P_1(\lambda)$. With mirror symmetry to the equatorial plane of the sphere, the polarization quantities of spectral components $\lambda$ of the second beam component (right-rotating polarization quantities) are plotted onto the lower hemisphere in a region $P_2(\lambda)$. These regions are shown with dotted lines. The symmetry with respect to the equator can be achieved, for example, by positioning a quartz plate, cut along the optical axis, in each arm of the interferometer, with the plates being oriented relative to one another orthogonally.

In this example, the polarization for a basic wavelength $\lambda_0$ and a further wavelength $\lambda_1$ is varied so that points $P_{1/2}(\lambda_{0/1})$ are located on a great circle, where C=0, with the M component of $P_{1/2}(\lambda_0)$ or $P_{1/2}(\lambda_1)$ always remaining the same and the only difference between the corresponding S components being their signs.

The representation also shows detection polarization $P_{det}$, which is transmitted by the analyzer at the interferometer output. In this example, $P_{det}$ is any linear polarization, represented by a point on the equator, which can also be very easily implemented using a simple polarizer as the analyzer.

After the beam components pass through the interferometer arms, the analyzer transmits only their projecting components $P_{det}(P_{1/2}(\lambda))$, and these components can interfere with each other and contribute to the detected signal. We can show that, for a single spectral component, e.g., with wavelength $\lambda_0$, this produces a phase difference $\gamma(\lambda_0)$ between the two beam components which is proportionate to spherical triangle area $\Omega(\lambda_0)$ stretching between points $P_1(\lambda_0)$, $P_2(\lambda_0)$ and $P_{det}$. This yields $\gamma(\lambda_0)=-\frac{1}{2}\Omega(\lambda_0)$.

The drawing shows triangle areas $\Omega(\lambda_0)$ and $\Omega(\lambda_1)$ for two different spectral components $\lambda_0$ and $\lambda_1$. $\Omega(\lambda_0)$ is delimited by solid lines and $\Omega(\lambda_1)$ by dotted lines.

The selection of optical components makes it possible to adjust $P_{1/2}{}^0$, $P_{det}$, $P_1(\lambda)$, and $P_2(\lambda)$ to one another so that additional phase $\gamma(\lambda)$ compensates for the interferometer dispersion or the wavelength dependence of the output signal, or even its dependence on the interferometer arm lengths.

In order to compensate for dispersion, areas $P_1(\lambda)$ and $P_2(\lambda)$ as well as $P_{det}$ are selected so that, for a basic wavelength $\lambda_0$, the variation in additional phase $\Delta\gamma(\lambda)=-\frac{1}{2}\Omega(\lambda_0)-\Omega(\lambda_1))$ just compensates for the interferometer phase difference induced by the variation in wavelength when the wavelength changes from $\lambda_0$ to $\lambda_1$, i.e., by $\Delta\lambda=\lambda_0-\lambda_1$. This adjustment is made possible by selecting $P_1(\lambda)$ and $P_2(\lambda)$ and/or $P_{det}$. $P_1(\lambda)$ and $P_2(\lambda)$ can be influenced by selecting input polarization $P_{1/2}{}^0$ and/or the position/orientation of the optical elements.

A preferred arrangement is provided by placing the parameters of polarization quantities $P_1(\lambda)$ and $P_2(\lambda)$ on great circle $P_1(\lambda_0)$, $P_2(\lambda_0)$, $P_{1/2}{}^0$ symmetrically to point $P_{1/2}{}^0$ (input polarization) on the Poincaré sphere and having the analyzer transmit polarization quantities $P_{det}$ on the equator of the Poincaré sphere. In this case, intensity $I(\lambda)$ downstream from the analyzer is:

$I(\lambda)=I_0[1+\cos 2\Theta \cos \phi(\lambda)+\cos \delta (\cos 2\Theta+\cos \phi(\lambda))+\sin \delta \sin 2\Theta \sin \phi(\lambda)]$ In this case, $2\Theta$ represents the distance angle defined by $P_{1/2}{}^0$ and $P_{det}$, and $\phi(\lambda)$ represents the distance angle defined by $P_{1/2}{}^0$ and $P_1(\lambda)$, on the Poincaré sphere; $\delta$ is the phase difference that existed between the two interfering beam components from the very beginning, e.g., caused by a difference between the interferometer arm lengths.

Polarization quantities $P_1(\lambda)$ and $P_2(\lambda)$ are distributed by two quartz plates of equal thickness d which are oriented opposite each other and are located at a 45° angle in the optical path. This yields:

$$\phi(\lambda) = \pi - 2\pi \frac{d \cdot \Delta n(\lambda)}{\lambda}$$

In this case, $\Delta n(\lambda)$ is the double refraction of the quartz plates at wavelength $\lambda$. By using this relation in the above intensity formula, we obtain spectral interferometer characteristic $I(\lambda)$.

Subsequent FIGS. 3a–c, 4 and 5 show examples of typical transmission characteristics of an interferometer according to the invention. The data is simulated. Except for in FIG. 3c, the wavelength of the electromagnetic radiation used is always plotted in $\mu m$ units on the x axis; the interferometer transmission, i.e., intensity $I(\lambda)$ detected at the interferometer output, is shown in any unit as a function of wavelength or path difference $\Delta(l \cdot n)$ or $l$ on the y axis.

With a given path length difference $\Delta ln$ in the interferometer arms, the transmission characteristic of a conventional two-beam interferometer has transmission maximums at $$\lambda_{max} = \frac{\Delta ln}{m}$$

and transmission minimums at $$\lambda_{min} = \frac{2\Delta ln}{2m+1},$$

where m is a whole number.

This variation is modified by placing optical components, two quartz plates of equal thickness d in the examples illustrated, in the optical path of the interferometer according to the invention.

Figure 3A:
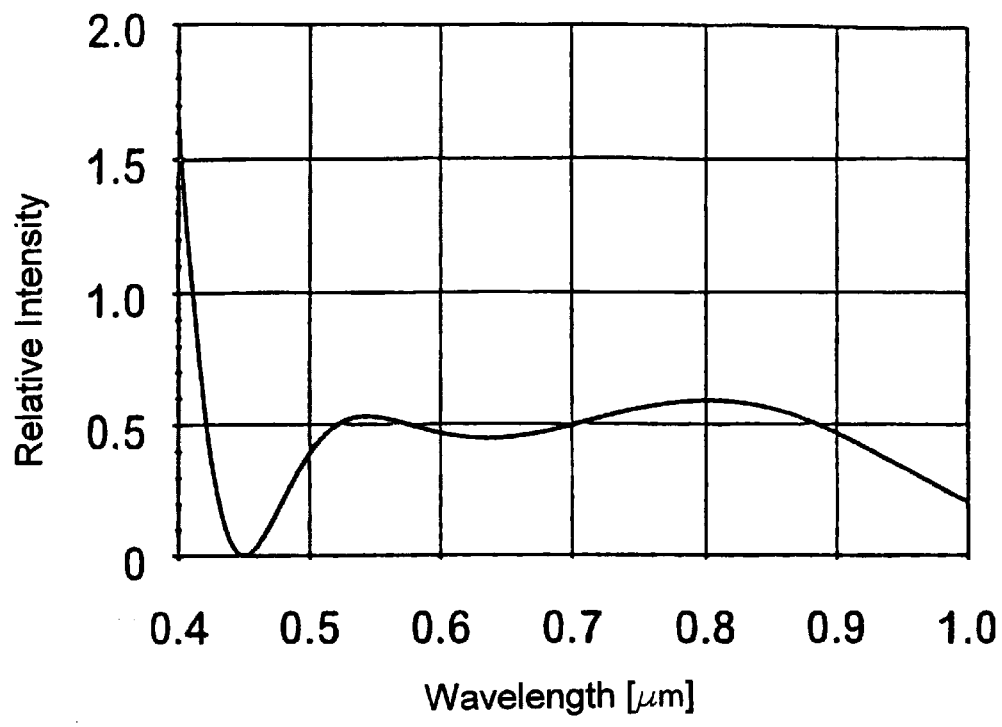
FIGS. 3a, 3b, 3c, 4 and 5 show graphical examples of transmission characteristics of an interferometer as a function of the wavelength or path difference for different parameter sets.

In FIG. 3a, the wavelength dependence of output signal $I(\lambda)$ was compensated for at wavelengths ranging from around 500 to 800 nm. In this range, the transmission curve reaches a plateau, i.e., the output signal is stable with respect to fluctuations in wavelength and is hence especially sensitive to fluctuations in the optical path difference. The parameter set used to achieve this dispersion-free interferometer is: $2\Theta=2.8$; $2d=150$ $\mu m$; $l=100$ $\mu m$, where $l$ is the initial path difference in the two interferometer arms, i.e., the difference in optical wavelength between the two beam components. l is related to initial phase difference δ described above as follows:

$$l = \frac{\delta \cdot \lambda}{2\pi \cdot n}$$

Figure 3B:
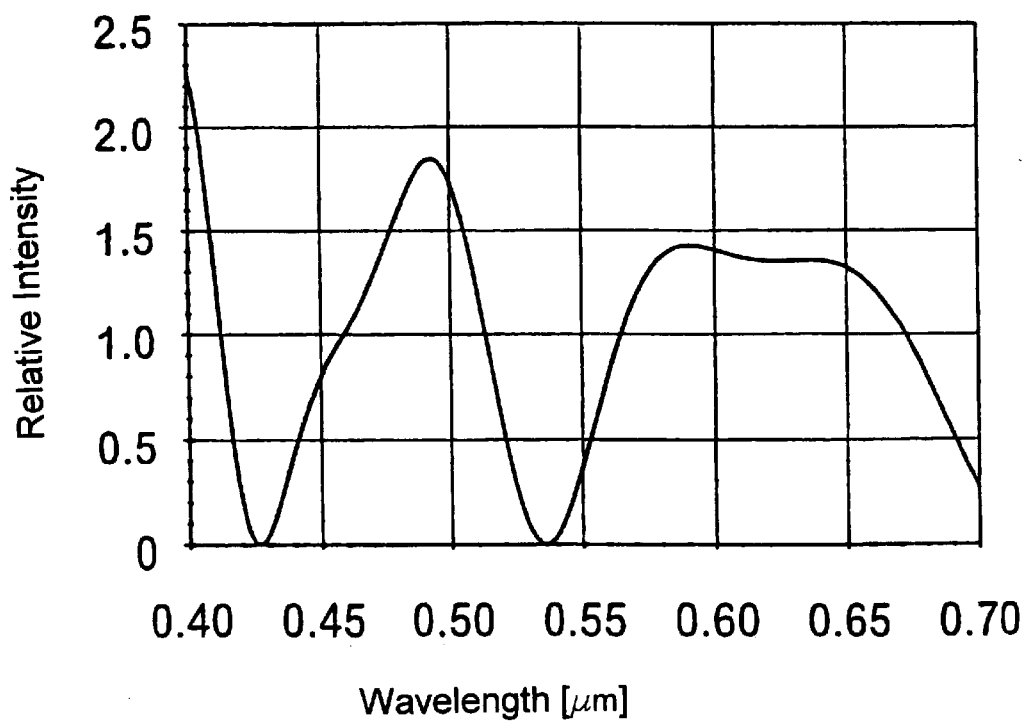

FIG. 3b shows a further example of dispersion compensation, using the parameters 2Θ=2.52, 2d=200 μm, and l=6,000 μm. The transmission characteristic achieves a plateau in the range around λ=600 nm.

Figure 3C:
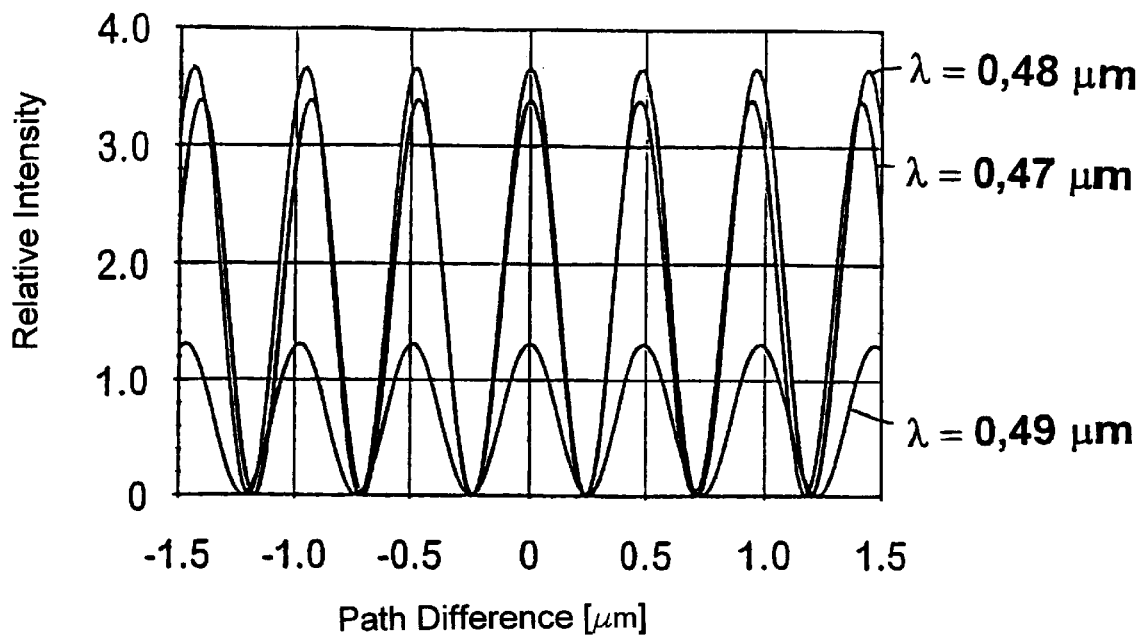

FIG. 3c shows the interferometer transmission characteristic as a function of initial path difference l in μm, using the parameters 2Θ=0 and 2d=540 μm. Intensity I(l) is plotted for three different wavelengths λ=0.48/0.47/0.49 μm. Although the amplitude of the transmitted intensity is heavily dependent on the wavelength, the variation of the illustrated intensities as a function of variable l is nearly identical for all three curves. In particular, the position of the intensity maximums and minimums illustrated in FIG. 3c are practically independent of the wavelength used and depend only on path length difference l. The use of the above-mentioned parameters therefore also provides a dispersion-free interferometer. The interferometer output signal is thus not influenced by fluctuations in wavelength and can be used to determine arm length difference l more precisely and without errors.

Figure 4:
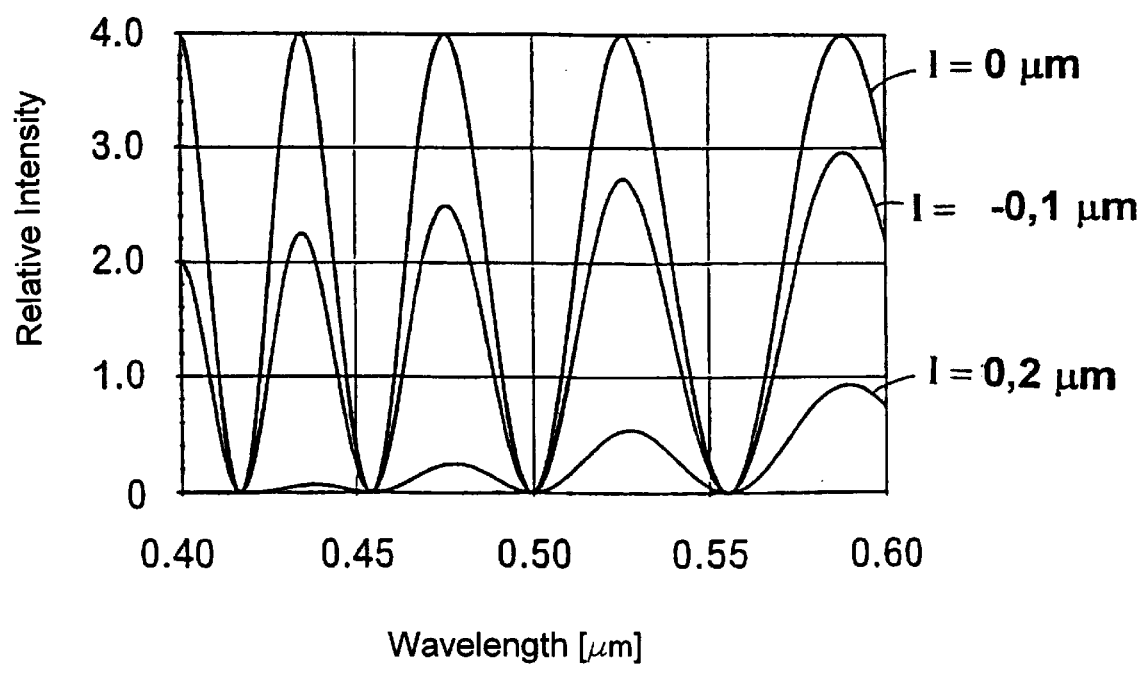

The parameters used in FIG. 3c are also used for the transmission characteristic shown in FIG. 4, namely 2Θ=0 and 2d=540 μm. In contrast to FIG. 3c, however, intensity I is plotted as a function of wavelength λ in this case. The three curves correspond to different values for path difference l=0/0.1/0.2 μm. Although the interferometer's two beam components have different path differences, the position of the maximum and minimum intensity values as a function of wavelength are nearly independent of the wavelength.

Figure 5:
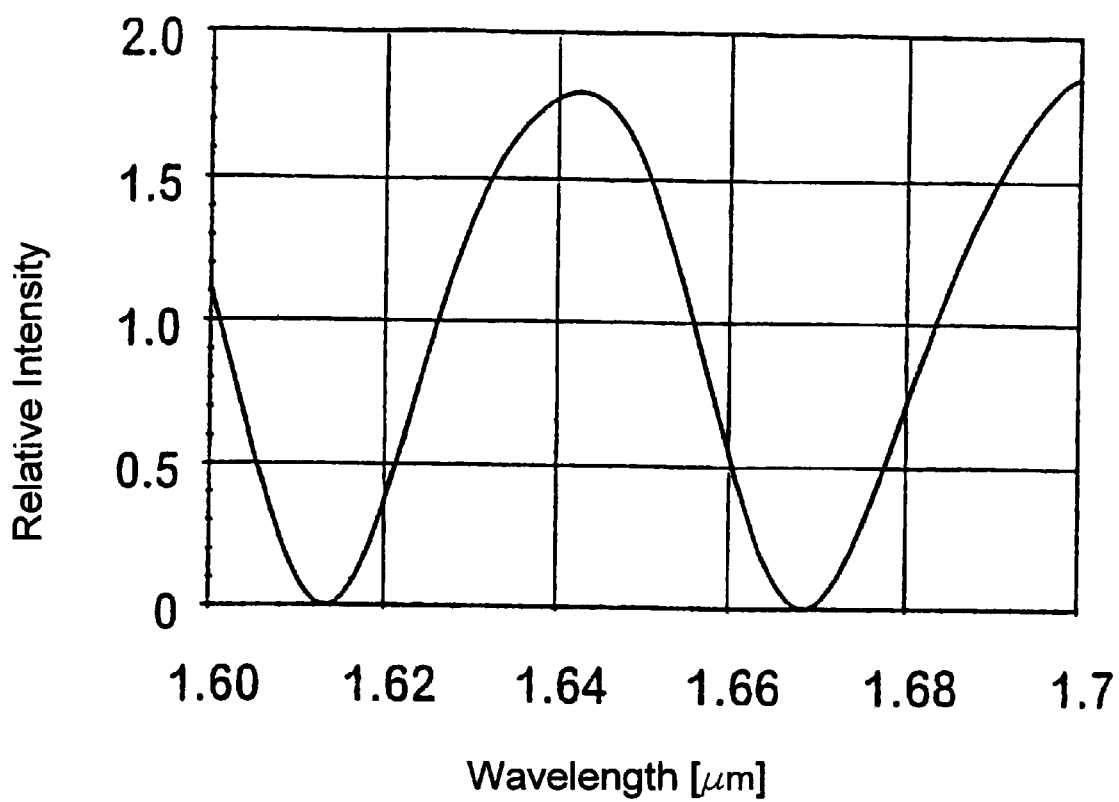

In FIG. 5, unlike FIGS. 3a–c, there is no compensation for the transmission wavelength dependence, but rather this dependence is increased by providing optical elements in the interferometer optical path. The interferometer has a periodic transmission range with broad transmission maximums and narrow minimums. The transmission curve therefore has areas where the transmission varies more with the wavelength than it does in non-manipulated interferometers. In these areas, slight variations Δλ in wavelength can therefore be detected because they produce greater variations in the output signal. The interferometer's spectral resolution is thus higher in certain wavelength ranges, which allows the wavelength ranges to be adjusted by selecting the optical elements. The parameters 2Θ=2.3, 2d=6,000 μm, and l=100 μm were used for this representation.

What is claimed is:

1. An interferometer for electromagnetic radiation, the interferometer comprising:
   at least two interferometer arms;
   a first beam splitter for splitting the light from an electromagnetic radiation source into two beam components supplied as electromagnetic partial waves to each of the at least two interferometer arms, the first beam splitter or a second beam splitter superimposing a first phase difference $$\Delta\varphi = 2\pi \frac{\Delta(l \cdot n)}{\lambda}$$

on the beam components after they pass through the interferometer arms so as to form a superimposed wave, the first phase difference being dependent on an optical path difference Δln within the interferometer arms and on a wavelength λ of the light;
   a detector for measuring the intensity of the superimposed wave;
   at least one polarizer disposed in the optical path for establishing a defined polarization state $P_{1/2}^0$ of the electromagnetic partial waves supplied to the interferometer arms, the defined polarization state being independent of the wavelength λ;
   at least one optical element disposed in at least one of the at least two interferometer arms for varying the polarization state $P_{1/2}^0$ of the respective electromagnetic partial wave as a function of the wavelength λ so as to encode each of a spectral component $\lambda_i$ with a polarization $P_{1/2}(\lambda_i)$ the electromagnetic partial waves taking on respective polarization states $P_1(\lambda)$ and $P_2(\lambda)$ corresponding to regions $P_1(\lambda)$ and $P_2(\lambda)$ on a Poincaré sphere, the regions $P_1(\lambda)$ and $P_2(\lambda)$ being at least partially different from each other; and
   an analyzer disposed at an output of the interferometer for transmitting an adjustable detection polarization state $P_{det}$ so as to form a projection $P_{det}(P_{1/2}(\lambda))$ for each spectral component $\lambda_i$ and produce a second phase difference $\gamma(\lambda)$ between electromagnetic partial waves of the spectral components, γ being a function of $P_{1/2}(\lambda)$ and $P_{det}$, the second phase difference being wavelength-dependent.

2. The interferometer of claim 1 wherein the defined polarization state is different for the two beam components.

3. The interferometer according to claim 1 wherein the at least one optical element includes at least one first optical element disposed in a first arm of the at least two interferometer arms and at least one second optical element disposed in a second arm of the at least two interferometer arms.

4. The interferometer according to claim 1 wherein the at least one polarizer includes the beam splitter, the beam splitter being a polarizing beam splitter.

5. The interferometer according to claim 1 wherein the at least one optical element includes at least one of a double-refractive plate, optically active plate, and elliptically double-refractive plate.

6. The interferometer according to claim 5 wherein the at least one optical element includes a crystal plate.

7. The interferometer according to claim 5 wherein the at least one optical element includes at least a first optical element disposed in a first arm of the at least two interference arms and a second optical element disposed in a second arm of the at least two interference arms, the first and second optical elements being oriented in different directions so that the respective polarization states $P_1(\lambda)$ and $P_2(\lambda)$ are different from each other as a result of a wavelength dependence of double refraction, optical activity, or elliptical double refraction.

8. The interferometer according to claim 2 wherein the at least one first optical element and the at least one second optical element are each a two-beam interferometer.

9. The interferometer according to claim 2 wherein the at least one optical element includes an anisotropic plastic or glass plate transparent in a range of the wavelength λ.

10. The interferometer according to claim 1 wherein the $P_{1/2}^0$, $P_{1/2}(\lambda)$ and $P_{det}$ are selectable through adjusting a relative position of the at least one polarizer, a relative position of the analyzer, and a choice and an alignment of the at least one optical element so that the second phase difference $\gamma(\lambda)$ compensates for the first phase difference $$\Delta\varphi = 2\pi \frac{\Delta(l \cdot n)}{\lambda}$$

with a fixed optical path difference $\Delta(l \cdot n)$ and so as to make an output intensity of the interferometer substantially independent of the wavelength $\lambda$ in a wavelength range $\Delta\lambda$ around a basic wavelength $\lambda_0$.

11. The interferometer according to claim 1 wherein the $P_{1/2}{}^0$, $P_{1/2}(\lambda)$ and $P_{det}$ are selectable through adjusting a relative position of at least one polarizer, a relative position of the analyzer, and a choice and an alignment of the at least one optical element so that the second phase difference $\gamma(\lambda)$ is substantially greater than the first phase difference $$\Delta\varphi = 2\pi \frac{\Delta(l \cdot n)}{\lambda}$$

and so as to modify an entire interferometer phase $\Delta\phi + \gamma(\lambda)$ so that a wavelength dependence of an output signal of the interferometer is increased in a wavelength range $\Delta\lambda$ around a basic wavelength $\lambda_0$.

12. The interferometer according to claim 10 wherein the at least one optical element includes at least one retardation plate, and wherein a spectral working area $\lambda_0$, $\Delta\lambda$ of the interferometer is capable of being varied by at least one of:
varying the position of the at least one polarizer so as to vary the polarization state $P_{1/2}{}^0$ of the respective electromagnetic partial wave;
varying the position of the analyzer so as to vary the detection polarization state $P_{det}$; and
at least one of adjusting, tilting, and changing the thickness and/or changing the orientation of at least one of the at least one retardation plate so as to vary the $P_{1/2}(\lambda)$.

13. The interferometer according to claim 11 wherein the at least one optical element includes at least one retardation plate, and wherein a spectral working area $\lambda_0$, $\Delta\lambda$ of the interferometer is capable of being varied by at least one of:
varying the position of the at least one polarizer so as to vary the polarization state $P_{1/2}{}^0$ of the respective electromagnetic partial wave;
varying the position of the analyzer so as to vary the detection polarization state $P_{det}$; and
at least one of adjusting, tilting, and changing the thickness and/or changing the orientation of at least one of the at least one retardation plate so as to vary the $P_{1/2}(\lambda)$.

14. The interferometer according to claim 1 wherein the analyzer includes a rotatable polarizing beam splitter.

15. A method for compensating for dispersion or wavelength dependence of an output intensity of an interferometer for electromagnetic radiation in the range around a basic wavelength $\lambda_0$ so as to achieve increased sensitivity of the interferometer to variations in an interferometer arm length difference $\Delta l$, the method comprising:
producing a defined wavelength-independent output polarization $P_{1/2}{}^0$ of electromagnetic partial waves entering arms of the interferometer, $P_1{}^0 \neq P_2{}^0$ being possible;
encoding individual spectral components of the electromagnetic partial waves with a wavelength-dependent polarization $P_1(\lambda)$ or $P_2(\lambda)$;
detecting a defined polarization $P_{det}$;
adjusting the polarizations $P_{1/2}{}^0$, $P_{1/2}(\lambda)$, and $P_{det}$ to each other so that the following applies to a wavelength $\lambda$ in a range of the $\lambda_0$:

$$\Upsilon(\lambda) = -\tfrac{1}{2}\Omega(P_{det}, P_1(\lambda), P_2(\lambda)) \approx d + 2\pi \frac{\Delta ln}{\lambda_0^2}(\lambda - \lambda_0)$$

$$\text{or } \frac{d\Omega}{d\lambda}(\lambda_0) \approx -4\pi \frac{\Delta ln}{\lambda_0^2}$$

where d is a constant and $\Omega(P_{det}, P_1(\lambda), P_2(\lambda))$ is an area of a spherical triangle defined for a fixed $\lambda$ by points $P_{det}$, $P_1(\lambda)$, and $P_2(\lambda)$ when the polarizations $P_{1/2}{}^0$, $P_{1/2}(\lambda)$, and $P_{det}$ are represented on a Poincaré unity sphere.

16. A method for increasing the spectral resolution of an interferometer for electromagnetic radiation in a range around a basic wavelength $\lambda_0$, the method comprising:
producing a defined wavelength-independent output polarization $P_{1/2}{}^0$ of electromagnetic partial waves entering arms of the interferometer, $P_1{}^0 \neq P_2{}^0$ being possible;
encoding individual spectral components of the electromagnetic partial waves with a wavelength-dependent polarization $P_1(\lambda)$ or $P_2(\lambda)$;
detecting a defined polarization $P_{det}$;
adjusting the polarizations $P_{1/2}{}^0$, $P_{1/2}(\lambda)$, and $P_{det}$ to each other so that $\Delta\phi(\lambda_0) << \tfrac{1}{2}\Omega(P_{det}, P_1(\lambda_0), P_2(\lambda_0))$ applies to $\lambda_0$, where $\Omega(P_{det}, P_1(\lambda_0), P_2(\lambda_0))$ is an area of a spherical triangle defined by points $P_{det}$, $P_1(\lambda_0)$, and $P_2(\lambda_0)$ when the polarizations $P_{1/2}{}^0$, $P_{1/2}(\lambda)$, and $P_{det}$ are represented on a Poincaré unity sphere.

* * * * *